Figure 1:
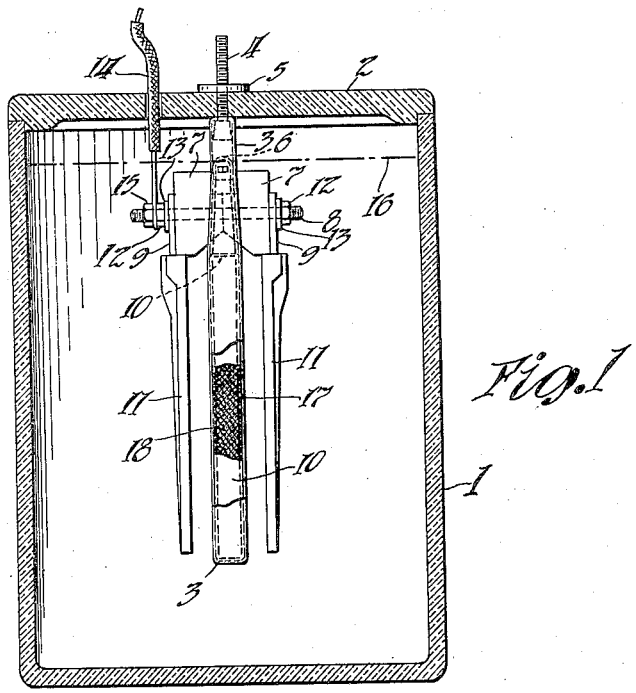

April 8, 1924.

T. A. EDISON 1,489,240

VOLTAIC BATTERY AND THE PRODUCTION OF ELECTRODE ELEMENTS THEREFOR

Filed Jan. 5, 1921

Witnesses:
H. L. Fisher
William A. Hardy

Inventor:
Thomas A. Edison
by Dyer & Holden
his Attys.

Patented Apr. 8, 1924.

1,489,240

UNITED STATES PATENT OFFICE.

THOMAS A. EDISON, OF LLEWELLYN PARK, WEST ORANGE, NEW JERSEY, ASSIGNOR TO THOMAS A. EDISON, INCORPORATED, OF WEST ORANGE, NEW JERSEY, A CORPORATION OF NEW JERSEY.

VOLTAIC BATTERY AND THE PRODUCTION OF ELECTRODE ELEMENTS THEREFOR.

Application filed January 5, 1921. Serial No. 435,122.

*To all whom it may concern:*

Be it known that I, THOMAS A. EDISON, a citizen of the United States, and a resident of Llewellyn Park, West Orange, New Jersey, have invented certain new and useful Improvements in Voltaic Batteries and the Production of Electrode Elements Therefor, of which the following is a description.

My invention relates to voltaic batteries and more particularly to that class of primary batteries wherein a depolarizing electrode consisting of an element or elements formed of a compound of copper, or other suitable depolarizing agent, and an electrode connected to the external negative pole and consisting of an element or elements of zinc, are disposed in a caustic alkaline electrolyte such as a solution of caustic soda or caustic potash, and also to the production of depolarizing material and electrode elements formed of such depolarizing material for batteries of this character.

In primary batteries of the type referred to, the depolarizing electrode elements are usually formed of black anhydrous cupric oxid, which is either properly molded and agglomerated in the form of plates or cylinders, or is packed within suitable, perforated, metallic containers. The voltage of the current obtained from such a battery is low, and the principal object of my invention is to produce a battery of this type from which a current of much higher voltage will be obtained.

In general, my invention consists in using cupric hydroxide instead of anhydrous cupric oxid of which the depolarizing electrodes of primary batteries of the character above described are usually formed.

Cupric hydroxide produced as a precipitate or in the presence of water is very unstable and even at ordinary temperatures dehydrates to black anhydrous cupric oxid. Crystallized cupric hydroxide has been produced but in order to do this it has been necessary to employ very low temperatures and to take other precautions. When such crystallized cupric hydroxide is used in a primary battery cell of the type described above, in place of the usual anhydrous cupric oxid, it quickly dehydrates to the anhydrous state and acts very capriciously in every way. I have found, however, that cupric hydroxide has a slight affinity for the hydroxides of the metals of the alkaline earths, namely, hydroxides of calcium, strontium, barium and magnesium, all of which are more or less insoluble in solutions of the stronger alkalies such as caustic soda and caustic potash usually employed in the electrolyte of primary battery cells of the type described, and that when cupric hydroxide is properly formed and combined with any of such hydroxides of the metals of the alkaline earths its stability will be very materially increased; and my invention further consists in an improved substance especially designed to be used in forming the depolarizing electrodes of such cells and comprising cupric hydroxide rendered stable under ordinary conditions, and also in the method of producing such substance. My copending application, Serial No. 695,156, filed February 26, 1924, entitled Production of material adapted especially for use as a depolarizing agent for voltaic batteries, is a division hereof and contains claims on the method just referred to for producing said substance.

Magnesium hydroxide is more insoluble in electrolytes consisting of solutions of caustic soda or caustic potash than any of the other alkaline hydroxides mentioned, and, accordingly, is the one which I prefer to combine with the cupric hydroxide to render the latter stable. The method which I prefer to employ in producing the cupric, magnesium hydroxide combination is as follows:

Copper sulphate and magnesium sulphate are first mixed in solution in proper proportions and the solution then subjected to the action of a caustic alkali, preferably caustic soda. This results in the formation of cupric hydroxide in the presence of magnesium hydroxide, these hydroxides being simultaneously precipitated. The precipitated cupric hydroxide combines with the precipitated magnesium hydroxide producing a salt sufficiently stable to prevent dehydration under ordinary conditions. The cupric hydroxide in this combination will not be decomposed or dehydrated to cupric oxid even at 140° Fahrenheit and in the presence of a strong alkali, and it is therefore practicable to form the depolarizing electrode elements of primary batteries of the type described, of this cupric and magnesium hydroxide combination. The proportions of cupric hydroxide and magnesium hydroxide in the combination described, which I find most favorable to stabilize the cupric hydroxide, are approximately 10 parts by weight of dry cupric hydroxide to approximately 4 parts by weight of dry magnesium hydroxide, and in producing this combination as above described the sulphates of copper and magnesium are preferably mixed in solution in such proportions that the precipitate produced upon treating the solution with the caustic soda will contain such hydroxides in these proportions. While a greater proportion of magnesium hydroxide may be used in the combination, no advantage results therefrom as the stability of the cupric hydroxide will be no greater.

In forming a depolarizing electrode element from the precipitate, produced as described above, and consisting of the combined cupric and magnesium hydroxides, I preferably proceed as follows:

The precipitate is first dried and then a small quantity of graphite is added thereto. This substance is then moistened and thoroughly mixed in a mixer until all the particles of the green cupric, magnesium hydroxide combination are covered with the graphite. This result will be attained when the mixing is continued until no green or greenish tint is observable in the mixture. The mixture is then dried, introduced into perforated metallic pockets or containers of the desired shape, and packed or pressed tightly into a substantially solid mass in each of such pockets. The pockets with the mixture packed therein are now ready to be mounted as the depolarizing electrode elements in primary battery cells such as described above. The graphite is thoroughly mixed with the cupric, magnesium hydroxide combinaton so as to render the same conductive throughout and to permit electrolytic reduction of the cupric hydroxide without too great resistance to the current when such a depolarizing electrode element is mounted in a cell.

The advantage which results from employing depolarizing electrode elements formed of my improved stable, cupric hydroxide material, in primary battery cells in place of the usual cupric oxid elements, is that the current generated by such cells is given out at a voltage of from approximately 1.1 volts down to 0.8 of a volt, as against 0.8 of a volt down to 0.5 of a volt, where depolarizing elements formed of cupric oxid are employed.

Figure 2:
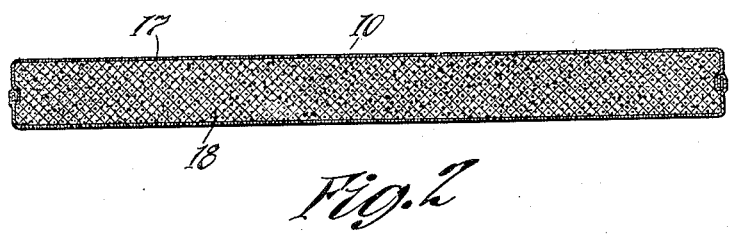

In the drawing accompanying and forming a part of this specification:

Figure 1 is a central vertical sectional view, partly in elevation and partly broken away, of a primary battery cell provided with my improved depolarizing electrode element; and Fig. 2 is an enlarged cross-sectional view of the depolarizing electrode element shown in Fig. 1.

Referring to the drawing, reference character 1 represents an ordinary battery jar or container, preferably of glass, provided with the usual cover 2 formed of insulating material, preferably porcelain. Reference character 3 represents a hanger or frame carrying the depolarzing electrode element 10, and preferably formed of a strip or sheet of copper or copper-plated iron or steel. The hanger 3 is preferably in the form of an inverted U as is usual, and is supported from the cover 2 in any suitable manner as by a bolt or screw-threaded rod 4 suitably secured thereto and extending through an aperture provided therefor in the cover, and a nut 5 threaded on the rod. A crossbar 6 is secured at its ends to the arms of the hanger 3 and bears on the top of the element 10. Insulating blocks 7, preferably formed of porcelain, are provided with reduced inner end portions disposed in recesses or notches provided therefor in the crossbar 6. The usual zinc elements or plates 11, 11 are respectively disposed at opposite sides of the element 10 in spaced relation thereto, these zinc plates being supported by a bolt or rod 8 carried by the insulating blocks 7. The bolt or rod 8 extends through the insulating blocks 7 and through lugs 9, 9 respectively secured to and extending upwardly from the zinc plates 11, 11. The parts are rigidly secured together with the zinc plates 11, 11 spaced and insulated from the element 10 by means of nuts 12, 12 threaded on the rod 8 and turned up tightly, washers 13 being disposed between the nuts 12, 12 and the respective lugs 9, 9. The bolt or threaded rod 4 constitutes one terminal of the cell, it being electrically connected with the depolarizing element 10. The other terminal of the cell as shown, consists of a conductor 14 extending through an aperture provided therefor in the cover 2 and secured to the rod 8, which is electrically connected to both of the zinc plates 11, 11, between one of the nuts 12 and another nut 15 threaded on the rod. The electrolyte 16, in which the battery elements are immersed, is a caustic alkaline solution, preferably a solution of caustic soda, and the level thereof is maintained at a point above the element 10 and the elements or plates 11, 11. The element 10 which is supported or carried by the hanger 3, consists of a rectangular container 17 formed of conductive metallic material, and filled with depolarizing material 18 packed tightly therein, this material being the cupric, magnesium hydroxide combination mixed with graphite, described above. The side walls of the container 17, that is, the walls of the container presented to the respective adjacent zinc elements 11, 11, are provided with numerous small and sligthly spaced perforations so as to permit ready access of the electrolyte to the depolarizing material 18 within the container.

It is to be understood that the depolarizing material and depolarizing electrode element, and also the methods of producing such material and element, described herein, are subject to numerous changes and modifications without departure from the spirit of the invention and the scope of the appended claims.

Having now described my invention, what I claim as new and desire to protect by Letters Patent of the United States is as follows:

1. An electrode element for voltaic batteries formed of a substance comprising cupric hydroxide, substantially as described.

2. An electrode element for voltaic batteries formed of a substance comprising cupric hydroxide mixed with graphite, substantially as described.

3. An electrode element for voltaic batteries formed of a substance comprising cupric hydroxide all particles of which are covered with graphite, substantially as described.

4. An electrode element for voltaic batteries formed of a substance comprising cupric hydroxide and a hydroxide of the metal of an alkaline earth mixed with graphite, substantially as described.

5. An electrode element for voltaic batteries formed of a substance comprising cupric hydroxide and magnesium hydroxide mixed with graphite, substantially as described.

6. A primary battery cell comprising an alkaline electrolyte having disposed therein an electrode, and a second electrode insulated from said first electrode and formed of a substance comprising cupric hydroxide, substantially as described.

7. A primary battery cell comprising a caustic alkaline electrolyte having disposed therein a zinc electrode element and an electrode element spaced and insulated from said zinc element and formed of a substance comprising cupric hydroxide, substantially as described.

8. A primary battery cell comprising an electrolyte consisting of a solution of caustic soda having disposed therein a zinc electrode element, and an electrode element spaced and insulated from said zinc element and formed of a substance comprising cupric hydroxide combined with a hydroxide of the metal of an alkaline earth, substantially as described.

9. A primary battery cell comprising an electrolyte consisting of a solution of caustic soda having disposed therein a zinc electrode element, and an electrode element spaced and insulated from said zinc element and formed of a substance comprising cupric hydroxide combined with magnesium hydroxide, substantially as described.

10. A depolarizing material for use in voltaic cells comprising a mixture of cupric hydroxide and a sufficient amount of a stabilizing substance to render the cupric hydroxide stable under ordinary conditions of operation of such cells, substantially as described.

11. A substance adapted for use as depolarizing material in voltaic cells comprising cupric hydroxide combined with a hydroxide of the metal of an alkaline earth, substantially as described.

12. A substance adapted for use as depolarizing material in voltaic cells comprising cupric hydroxide combined with magnesium hydroxide, substantially as described.

13. A substance adapted for use as depolarizing material in voltaic cells comprising a combination of approximately 10 parts by weight of cupric hydroxide and 4 parts by weight of a hydroxide of the metal of an alkaline earth, substantially as described.

14. A substance adapted for use as depolarizing material in voltaic cells comprising a combination of approximately 10 parts by weight of cupric hydroxide and 4 parts by weight of magnesium hydroxide, substantially as described.

This specification signed this 31st day of December, 1920.

THOS. A. EDISON.